Patented Feb. 27, 1951

2,542,981

UNITED STATES PATENT OFFICE 2,542,981

UNSATURATED TERTIARY AMINE-P₂S₅ REACTION PRODUCTS AND LUBRICATING OILS CONTAINING SAME

John D. Bartleson, Cleveland, and Everett C. Hughes, Cleveland Heights, Ohio, assignors to The Standard Oil Company, Cleveland, Ohio, a corporation of Ohio No Drawing. Application July 3, 1946, Serial No. 681,416

13 Claims. (Cl. 252—32.7)

This invention relates to compositions suitable as lubricants and lubricant additives for use under various conditions, including high temperatures or high pressures or both, as for instance, use in an internal combustion engine operating at higher temperatures and in which the lubricant is in close contact with metallic surfaces, metal compounds and high temperature gases, and use as gear lubricants when surfaces must be lubricated which are subjected to high pressures.

The objects achieved in accordance with the invention include the provision of an agent which may be useful itself as a lubricant, and which, when added to lubricants, will markedly inhibit the very objectionable deposition of lacquer, acid and sludge formation, corrosion and other types of deterioration which tend to occur under operating conditions; the provision of lubricating oils containing such an addition agent; and other objects which will be apparent as embodiments are disclosed hereinafter.

In accordance with the invention, it has been found that a phosphorus sulfide may be reacted with an unsaturated tertiary amine having at least 12 carbon atoms at an elevated temperature and the resulting reaction product will have good solubility in lubricating oils and greases. These reaction products have highly advantageous properties as additives for lubricants. They improve the corrosion, lacquer, sludge, viscosity increase, and the like characteristics of lubricating oils. In addition, if an element of the sulfur family, i. e., sulfur, selenium or tellurium, is incorporated into the reaction product, still further improved additives are obtained. Derivatives obtained from these sulfide-amine derived products, e. g., metal derivatives, nitrogen base derivatives, ester derivatives, or mixtures, or mixed derivatives thereof also have these desired properties.

The above reaction products may be used as antioxidants or stabilizers for organic materials which are subject to oxidative deterioration, e. g., elastomers, rubber, asphalt, plastic materials, paints, fats and fatty oils, gasoline, and the like.

The sulfide-amine reaction temperature conditions vary somewhat with the amine used. The temperature should be high enough for the desired reaction to occur and not be so high as to decompose the reaction product. In general the temperature preferably should be elevated, e. g., it may be 250° F. to about 600° F. or above, and desirably in the range of about 300° to 500° F. at atmospheric pressure. Economy of heat suggests that a temperature higher than that necessary to carry out the reaction will be wasteful.

The reaction time varies somewhat with the amine and the temperature and falls within the general range of from one minute to about six hours, desirably from about ¼ to about ¾ hours and preferably about ½ hours. The reaction is usually complete in four hours or less time. The reaction time is a function of the temperature, the amount of the sulfide that is to react, the subdivision of the sulfide, rate of stirring, etc. The reaction is somewhat exothermic and on a commercial scale the heat evolved thereby may be used to maintain the temperature. The ingredients may be added in increments if this is desirable for temperature control or for other reasons.

The reactions may be carried out in the presence or absence of air, or in an atmosphere of a non-deleterious gas, such as $H_2S$ or nitrogen.

The sulfide-amine reaction may be carried out with direct admixture of the reactants, or by their admixture in the presence of a diluent which may or may not be subsequently removed. A volatile inert solvent, such as a saturated hydrocarbon boiling in the desired temperature range, may be used as a diluent which is to be subsequently removed. If a volatile solvent is used, it may be selected so as to have a boiling point that will assist in controlling the temperature if the reaction is carried out under reflux conditions. Alternatively, a heavier oil such as white oil, or a lubricating oil of about the same properties as that to which the new composition is to be added, may be used as a diluent which is not to be removed. In a commercial embodiment of the invention, a diluent probably would not be used unless it is a mineral oil, and a diluent is not necessary.

The unsaturated amine or mixture of amines may be reacted with the phosphorus sulfide or a mixture of phosphorus sulfides in ratios of about 0.1 to about 1.0 mol of sulfide per olefinic double bond per mol of amine. Even small amounts show a significant improvement. Generally, about 0.5 to about 1.0 mold of sulfide is the usual range that will be used.

The pentasulfide is preferred although other phosphorus sulfides or mixtures of sulfides may be employed. Phosphorus pentasulfide is most economic and readily available and for this reason is used in the illustrative examples. Under suitable conditions sulfides of arsenic or antimony may be similarly employed.

A large variety of unsaturated tertiary amines are suitable, for example, aliphatic, aromatic or heterocyclic tertiary amines containing at least one olefinic double bond per molecule; all of the nitrogens in these amines are tertiary, that is, they do not contain an amine hydrogen attached directly to the nitrogen. The choice may be controlled by the desired lubricant solubility characteristics of the primary sulfide-amine or the final derivative product. The amine should not be so highly unsaturated or conjugated as to give reaction products which are not oil dispersible.

The preferred unsaturated tertiary amines have an aliphatic radical of at least 10 carbon atoms, and of these, those containing one olefinic double bond situated in a long chain radical are particularly preferred. The other constituents may be short chain aliphatic radicals of from 1 to 5 carbon atoms. Analogous polyamines which contain no hydrogen attached directly to the nitrogen may be used. Commercial octadecenylamine is readily converted to the corresponding octadecenyldimethylamine, e. g., by heating with methyl chloride, and for this reason is used for illustrative purposes. Typical unsaturated tertiary amines are: octadecenyl-dimethylamine, hexadecenyl - dimethylamine, tetradecenyl - dimethylamine, dodecenyl-dimethylamine, decenyl-dimethylamine, and the corresponding tertiary amines wherein either one or both of the methyl groups are replaced by ethyl, propyl, butyl or pentyl radicals, or the corresponding dienyl or trienyl amines. The amine stock may be a mixture of amines of different molecular weight and different degrees of unsaturation. It need not be pure and amounts of other amines may be present, provided that the above unsaturated amine is the major or essential component.

The process is preferably conducted so that the yield is very high and appreciable amounts of oil insoluble products are not formed. Generally the amount of sulfide is chosen so that it will all react at the temperature selected, and the reaction is continued until it is consumed.

To achieve an additional improvement which results if additional reacted sulfur is present in the additive, about 0.01 to 2.0 and preferably 0.1 to 1.0 (gram) atom of sulfur per (gram) olefinic double bond is incorporated therein. This sulfur can be incorporated by adding elemental sulfur, preferably after the formation and cooling of the high temperature primary reaction product, and maintaining the mass at about 200° to 300° F. for about a few minutes to several hours, and preferably about one hour. Selenium and tellurium function in much the same way as sulfur in this respect, and may be incorporated similarly. Alternatively, the sulfur can be added to the metal, nitrogen base, or ester derivatives.

The sulfide-amine reaction products including those containing an added sulfur family element may be utilized in the form of their metal, nitrogen base or ester derivatives. Mixed derivatives or mixtures of the derivatives may be employed. These derivatives are formed from agents capable of replacing an acid hydrogen atom. Although the formation of the above derivatives may not involve replacement of acid hydrogen, the materials used as agents fall into the class of materials capable of replacing or reacting with acid hydrogen.

The metal derivatives may be formed from one or more metal compounds, such as their sulfides, oxides, hydroxides, carbides and cyanamides. These metals may be one or made of the following: an alkali metal, such as sodium, potassium and lithium; an alkaline earth metal, such as calcium, barium, strontium; or aluminum or other metal lower than aluminum in the electromotive series, such as zinc, lead, chromium, cobalt, antimony, arsenic, tin, copper or molybdenum. The metal should be selected with reference to the use of the composition and the properties desired in it. The alkali and alkaline earth metals have excellent detergent characteristics. The heavier metals have surface corrosion inhibition characteristics. The preferred metals are group I, group II and group III metals of the periodic table, such as potassium, zinc, barium and aluminum.

When a metal, nitrogen base, or ester derivative is desired, there are two primary alternative ways of producing it: (1) the amine-sulfide reaction product can be reacted with an element of the sulfur family and this reaction product then converted into the derivative, or (2) the primary amine-sulfide reaction product can be converted into the derivative and this derivative then reacted with an element of the sulfur family.

In the second alternative method, when a more oil-soluble type metal derivative is to be made, the amine-sulfide reaction product can be made at a temperature below about 400° F.; then the metal derivative thereof can be made at a temperature above about 400° F.; and then an element of the sulfur family can be incorporated as disclosed hereinbefore.

In the preparation of the above type metal derivatives, if the primary amine-sulfide reaction product was made at or heated to above about 400° F., as described heretofore, the reaction step of forming the metal derivatives may be carried out at temperatures in the range of about 100° to about 400° F., a temperature in the range of about 180° to 250° F. being preferred. This reaction is also usually completed in four hours or less time, and the same factors as to reaction time are involved as discussed heretofore. Alternatively, if the primary amine-sulfide reaction product has not been subjected to a temperature of at least about 400° F., the above type metal derivative may be prepared at or subjected to this higher temperature as described heretofore. A diluent may be used, as described heretofore, in making the metal derivatives, but is not necessary. If a diluent is used in the amine-sulfide reaction, it can be carried over into this reaction step and be subsequently separated if desired.

From about 0.25 to about 6.0 equivalents of the metal compound may be used per mol of the sulfide in the sulfide-amine reaction product, preferably about 1.0 to about 3.0 equivalents. An equivalent is the quotient of a mol divided by the valence of the metal concerned. The metal hydroxide is generally insoluble in the amine-sulfide reaction product and the amount that reacts is the amount that is no longer present as a solid phase in the reaction mass.

The reaction products obtained by reacting sulfur with the amine-sulfide reaction products may be converted to their nitrogen base derivatives by reaction with one or more basic nitrogenous compounds such as ammonia, amines, or heterocyclic nitrogen bases. Generally, ammonia and the gaseous or liquid amines or nitrogenous organic compounds are preferred. The organic nitrogen bases may be one or more of the following: mono-, di- or tri-alkyl, -aryl, or mixed alkyl aryl amines, wherein the alkyl or aryl groups may be methyl, ethyl, propyl, isopropyl, butyl, isobutyl, secondary butyl, normal pentyl, a secondary pentyl, isopentyl, hexyl, cyclohexyl, phenyl, methylphenyl, a dimethylphenyl, a trimethylphenyl, or the like. The heterocyclic bases may be typified by pyridine, a lower alkyl substituted pyridine where the alkyl may be an ethyl, methyl, or propyl group, quinoline, isoquinoline, and the like. Analogous polyamines may be used similarly, e. g., ethylene diamine, di-ethylene triamine, and the like.

The reaction of forming the nitrogen base derivative of the primary sulfide-amine reaction product may be carried out at room temperatures or above, depending upon the boiling point or the melting point of the nitrogen bases used. In the case of volatile amines or ammonia, room temperature is preferred. In the case of a liquid nitrogen base, a higher temperature may be used although the temperature preferably should not be above the boiling point of the nitrogen base. For a normally solid nitrogen base, temperatures above its melting point are preferred, but the temperature should not be above the boiling point thereof. Atmospheric or elevated pressures may be used and in the case of the more volatile nitrogen bases, an elevated pressure is preferred. This reaction is also completed in four hours or less time and the same factors as to reaction time are involved as discussed heretofore. A diluent may be used as described heretofore but is not necessary. If a diluent is used in the sulfide-amine reaction, it may be carried over into this reaction step and may be subsequently separated, if desired. In general, it is preferred to prepare the primary reaction product in one step, and to prepare its nitrogen base derivative in a separate step. However, if desired, a one-step process of preparing the final product may be used.

From about 0.25 to about 6.0 equivalents of the nitrogen base may be used per mol of the sulfide in the sulfide-amine reaction product, preferably about 1 to about 4 equivalents. An equivalent is the quotient of a mol divided by the valence of the nitrogen base concerned.

The ester derivatives may be prepared by reaction of the sulfide-amine reaction products with one or more alcohols, or thio-alcohols, or alkyl, aryl, cycloalkyl, and heterocyclic compounds containing an alcoholic or thio-alcoholic group. These alcohols may be illustrated by the following: methanol, ethanol, isopropanol, normal propanol, a butanol, a pentanol, an isopentanol, a cyclohexanol, a benzyl alcohol, phenyl ethyl alcohol, phenol, a methyl phenol, a polyalkyl phenol, an ethyl phenol, a diethyl phenyl, alkoxy phenols, a methoxy phenol, a hydroxy pyridine, a hydroxy quinoline, a hydroxy isoquinoline, a hydroxy alkanolamine, ethanolamine, diethanolamine, triethanolamine, polyhydric alcohols, ethylene glycol, diethylene glycol, propylene glycol, glycerine, resorcinol, and (ring) alkyl substituted resorcinol, phloroglucinol, and the like alcohols, and the corresponding thiol alcohols or mercaptans. The word alcohol is used in its generic sense to include any of the above types of compounds. The alcohol used in forming the ester should be selected with reference to the use of the final composition and the properties desired in it.

The reaction of forming the ester derivatives may be carried out at temperatures in about the range of about 100° to 400° F., a temperature of 180° to 280° F. being preferred. This reaction is usually completed in four hours or less time, and the same factors as to reaction time are involved as discussed hereinbefore. A diluent may be used, as described hereinbefore, in making the ester derivative but a diluent is not necessary. If a diluent is used in the sulfide-amine reaction, it can be carried over into the reaction step of forming the ester derivative and be subsequently separated, if desired. From about 0.2 to about 6.0 equivalents of the esterifying agent may be used per mol of the sulfide in the sulfide-amine reaction product, preferably about 1.0 to about 4.0 equivalents. An equivalent is the quotient of a mol divided by the valence (e. g. number of alcoholic groups in the molecule) of the agent used.

It is beneficial to have water present in the reaction step of forming the metal or the nitrogen base derivative, and this may be introduced as water of crystallization, or as a hydrate of the metal compound or of the nitrogen base, or it may be introduced separately. A plurality of metals, or of nitrogen bases, or of esterifying agents, or mixtures of any two or more thereof, may be used, i. e., sodium and calcium, calcium and barium, calcium or zinc and aluminum or tin, ammonia, saturated or unsaturated aliphatic, naphthenic or aromatic or mixed nitrogen bases, esterifying agents or any one or more of the above named metals with any one or more of the above nitrogen bases or alcohols. If the amount of the metal, nitrogen base or alcohol or combinations thereof, is small, the final product may be a mixture of the initial reaction product and the metal, nitrogen base or ester derivative. The yield in the above reaction step is very high.

After this reaction step is complete, the reaction mass may be used directly as an additive, or preferably it is processed, e. g., centrifuged or filtered, to remove water and any traces of oil insoluble by-product substances. If an excess of the basic metal compound is used, the unreacted excess may be separated at this stage. If a solvent is used as a diluent, it may be removed by vacuum distillation at this stage.

The reactions may be carried out in the absence of air or in an atmosphere of an inert gas, such as nitrogen.

These new compositions impart many desirable properties to lubricants to which they have been added. They act as very powerful detergents therein, and also as inhibitors of corrosion and lacquer and sludge formation. They also improve the extreme pressure characteristics of lubricants.

The amount of the above described primary phosphorus sulfide-amine reaction product or derivative thereof to be added to an oil or grease will depend upon the characteristics of the oil or grease and the intended use. Some oils have more of a tendency to corrode metals, or to form acids, sludges and lacquer deposits than others, and such oils require larger quantities of the addition agent. Also oils that are intended for higher temperatures require larger amounts of the additive. In general, for lubricating oils the range is from 1 to 10% by weight but under some circumstances amounts as low as .01% show a significant improvement. There is no upper limit since the additive is a lubricant, but it may be uneconomical to add more than is necessary to impart to the lubricant the desired properties.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

Example 1

18.35 grams of 9-octadecenyl dimethyl amine, 13.8 grams of phosphorus pentasulfide and 55 grams of No. 225 Red oil (a conventional acid treated Mid-Continent lubricating oil base stock of S. A. E. 20) were mixed and heated to 300° F. in an inert nitrogen atmosphere for two hours with agitation. The resulting product appeared to be oil insoluble; the reaction mass or mixture was heated to 500° F. and held at that temperature for thirty minutes with agitation. The reaction mass was filtered hot. 55 grams of a semi-solid brown oil filtrate was obtained as a product. This product was used as the additive in the test reported hereinafter.

Example 2(a)

36.7 grams of 9-octadecenyl dimethyl amine, 13.8 grams of phosphorus pentasulfide and 110 grams of No. 225 Red oil (a conventional acid treated Mid-Continent lubricating oil base stock of S. A. E. 20) were mixed and heated to 500° F. in an inert atmosphere for 30 minutes with agitation.

The reaction mass was filtered hot. 140 grams of filtrate was obtained as a product. It analyzed 3.53 weight percent S, and 2.22 weight percent P.

Example 2(b)

76 grams of the above product 2(a) was mixed with 4.2 grams of potassium hydroxide containing 8.05 grams of water, and heated for 1 hour on a steam bath. The resulting reaction mass was blown with nitrogen at 250° F. for 1 hour and then filtered. 71 grams of product was recovered as a filtrate. It analyzed 8.65 weight percent ash, 3.05 weight percent S, and 2.28 weight percent P.

In order to demonstrate the properties of the sulfide-amine reaction products in improving the characteristics of lubricating oils, a number of representative additives were incorporated into conventional lubricating oils. The lubricating oils containing these additives were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September, 1941, and in another paper by the same authors presented at the New York city meeting of the American Chemical Society in September, 1944, published in Industrial and Engineering Chemistry, Analytical edition, vol. 17, No. 5, May, 1945, pages 302–309. The latter paper also correlates the results of such laboratory tests with the so-called standardized "Chevrolet engine test."

Essentially the laboratory test equipment consists of a vertical thermostatically heated, large glass test tube, into which is placed a piece of steel tubing of about one third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "Standard" test the temperature used is approximately the average temperature of the crankcase. The rate of air flow per volume of oil is adjusted to the same as the average for a test engine in operation. Of the catalytic effects, those due to iron are the most important. They are empirically duplicated by the addition of a soluble iron salt. Those due to lead-bromide are duplicated by its addition. In the "Standard" test, 0.012% of iron salt is added; and in the "Iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following table were obtained from tests using:

A 160 cubic centimeter sample of the lubricant composition
70 liters of air per hour
100 square centimeters of steel surface
4.4 square centimeters of copper-lead surface
1.0 square centimeters of copper surface
0.01% by weight of lead bromide powder
0.05% soluble iron calculated as $Fe_2O_3$
(Ferric 2-ethyl hexoate in C. P. benzene)

The "Iron tolerance" tests were run at 280° F. for thirty-six hours. The lacquer is deposited on the steel tube and is determined by difference in weight of the tube after washing with chloroform and drying to constant weight. The corrosion was determined by difference in weight of the metal pieces after scrubbing with chloroform. The used oil was sufficient to enable the determination of all of the usual oil tests, viz. isopentane insolubles, viscosity, acid number, etc.

The data in the following tables shows the results obtained in testing the new additives by the tests described.

"Iron tolerance" tests on a conventional Mid-Continent acid treated heavy duty lubricating oil base stock (S. A. E. 30) and compositions containing this oil and sulfide-amine reaction products of the invention were run for several of the additives. The results given in the following table are representative.

Table I

| Additive of Example No. | None | 1 | 2(a) | 2(b) |
|---|---|---|---|---|
| Concentration of Additive in per cent by weight | 0 | 1.5 | 1.5 | 1.5 |
| Lacquer Deposit (in milligrams) | 39.4 | 11.8 | 3.4 | 0.1 |
| Sludge (isopentane insoluble in milligrams) | 809.2 | 103 | 4.0 | 6 |
| Corrosion (in milligrams) weight loss of: Cu-Pb | 6.4 | 0.5 | 0.5 | 2.0 |
| Acid Number | 9.4 | 0.7 | 1.4 | 1.2 |
| Viscosity Increase (SUS) | 658 | 57 | 21 | 24 |

These data show the marked improvement imparted to the lubricating oil by the sulfide-amine products of the invention. The very marked improvement in the sludge and the viscosity increase characteristics is particularly noteworthy as are the very low acid number and lacquer values. It is to be noted that these improvements are achieved with only 1.5% of the additives in the oil.

In order to prevent foaming of the oil containing a small proportion of the additive it is desirable in some cases to add a very small amount of tetra-amyl silicate, or an alkyl ortho carbonate, ortho formate or ortho acetate. 0.0003% of poly-alkyl-silicone oil, or 0.001% of tetra-amyl silicate was found to prevent foaming upon bubbling of air through oil containing a few per cent of the additive.

It will be obvious to one skilled in the art that sulfide-amine reaction products and similar products obtained by introducing phosphorus and/or sulfur into an amine as prepared according to different procedures but having substantially the same properties as those herein described, may be converted to derivatives or made up into lubricant compositions or both in accordance with the invention. The invention as claimed contemplates all such compositions except as do not come within the following claims.

We claim:

1. The reaction product of a phosphorus sulfide and an oil-soluble unsaturated tertiary amine forming an oil-soluble reaction product with a phosphorus sulfide, reacted in proportions within the range of 0.1 to 1.0 mol of the sulfide per olefinic double bond per mol of the amine and at a temperature within the range of 250 to 600° F. for a time to substantially complete the reaction to produce an oxidation inhibitor for organic compounds.

2. The reaction product of a phosphorus sulfide and an oil-soluble unsaturated tertiary amine forming an oil-soluble reaction product with a phosphorus sulfide, reacted in proportions within the range of 0.1 to 1.0 mol of the sulfide per olefinic double bond per mol of the amine and at a temperature within the range of 250 to 600° F. for a time to substantially complete the reaction to produce an oil-dispersible reaction product suitable for addition to a lubricating oil to inhibit the deterioration thereof in use.

3. The reaction product of a phosphorus sulfide and an oil-soluble unsaturated tertiary amine forming an oil-soluble reaction product with a phosphorus sulfide, reacted in proportions within the range of 0.1 to 1.0 mol of the sulfide per olefinic double bond per mol of the amine and at a temperature within the range of 250 to 600° F. for a time to substantially complete the reaction to produce an oil-dispersible reaction product suitable for addition to a lubricating oil to inhibit the deterioration thereof in use, and which contains an added reacted element of the sulfur family, reacted therewith in proportions within the range of 0.01 to 2 mols of said element per olefinic double bond per mol of the amine and at a temperature within the range of 200° to 300° F.

4. The reaction product of an unsaturated tertiary amine containing an aliphatic radical having from 10 to 18 carbon atoms, and phosphorus pentasulfide reacted in proportions within the range of 0.1 to 1.0 mol of the sulfide per olefinic double bond per mol of the amine and at a temperature within the range of 250 to 600° F. for a time to substantially complete the reaction to produce an oil-dispersible reaction product suitable for addition to a lubricating oil to inhibit the deterioration thereof in use.

5. The reaction product of an unsaturated tertiary amine containing an aliphatic radical having from 10 to 18 carbon atoms and at least one olefinic double bond and phosphorus pentasulfide reacted in proportions within the range of 0.1 to 1.0 mol of the sulfide per olefinic double bond per mol of the amine and at a temperature within the range of 250 to 600° F. for a time to substantially complete the reaction to produce an oil-dispersible reaction product suitable for addition to a lubricating oil to inhibit the deterioration thereof in use.

6. A lubricant comprising a mineral lubricating oil and an amount within the range of 0.01% to 10% by weight to inhibit deterioration of the oil in use of a reaction product of phosphorus pentasulfide and an unsaturated tertiary amine containing a straight chain hydrocarbon radical having from 10 to 18 carbon atoms and one olefinic double bond reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product.

7. A lubricant comprising a mineral lubricating oil and an amount within the range of 0.01% to 10% by weight to inhibit deterioration of the oil in use of a reaction product of phosphorus pentasulfide and an unsaturated tertiary amine containing a straight chain aliphatic radical having from 10 to 18 carbon atoms and one olefinic double bond reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product which contains added reacted sulfur, reacted therewith in proportions within the range of 0.01 to 2 mols of sulfur per olefinic double bond per mol of the amine and at a temperature within the range of 200° to 300° F.

8. A lubricant comprising a mineral lubricating oil and an amount within the range of 0.01% to 10% by weight to inhibit the deterioration of the oil in use of a reaction product of phosphorus pentasulfide and an amine having the formula

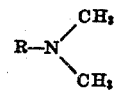

wherein R is an aliphatic hydrocarbon radical of from 10 to 18 carbon atoms containing one olefinic double bond reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product.

9. A lubricant comprising a mineral lubricating oil and an amount within the range of 0.01% to 10% by weight to inhibit the deterioration of the oil in use of a reaction product of phosphorus pentasulfide and an amine having the formula

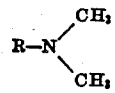

wherein R is an aliphatic hydrocarbon radical of from 10 to 18 carbon atoms containing one olefinic double bond reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product which contains added reacted sulfur, reacted therewith in proportions within the range of 0.01 to 2 mols of sulfur per olefinic double bond per mol of the amine and at a temperature within the range of 200° to 300° F.

10. A lubricant comprising a mineral lubricating oil and an amount within the range of 0.01% to 10% by weight to inhibit the deterioration of the oil in use of a reaction product of one mol of an octadecenyl tertiary amine and from about 0.5 to 1.0 mol of phosphorus pentasulfide per olefinic double bond in the amine reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product.

11. A lubricant comprising a mineral lubricating oil and an amount within the range of 0.01% to 10% by weight to inhibit the deterioration of the oil in use of a reaction product of one mol of an octadecenyl tertiary amine and from about 0.5 to 1.0 mol of phosphorus pentasulfide per olefinic double bond in the amine reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product which contains added reacted sulfur, reacted therewith in proportions within the range of 0.01 to 2 mols of sulfur per olefinic double bond per mol of the amine and at a temperature within the range of 200° to 300° F.

12. A lubricant comprising a mineral lubricating oil and an amount within the range of 0.01% to 10% by weight to inhibit the deterioration of the oil in use of a derivative of a reaction product of an oil-soluble unsaturated tertiary amine and a phosphorus sulfide reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product, said derivative being selected from the group consisting of a metal derivative and a nitrogen base derivative thereof.

13. A lubricant comprising a mineral lubricating oil and an amount within the range of 0.01% to 10% by weight to inhibit the deterioration of the oil in use of a potassium derivative of a reaction product of phosphorus pentasulfide and an amine having the formula of

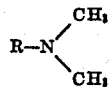

wherein R is an aliphatic hydrocarbon radical having at least 10 carbon atoms containing one olefinic double bond reacted in proportions within the range of 0.1 to 1.0 mol of the sulfide per olefinic double bond per mol of the amine and at a temperature within the range of 250 to 600° F. for a time to substantially complete the reaction to produce a deterioration inhibiting oil-dispersible reaction product, which contains added reacted sulfur, reacted therewith in proportions within the range of 0.01 to 2 mols of sulfur per olefinic double bond per mol of the amine and at a temperature within the range of 200° to 300° F.

JOHN D. BARTLESON.
EVERETT C. HUGHES.

REFERENCES CITED

The following references are of record in the file of this patent:

UNITED STATES PATENTS

| Number | Name | Date |
| --- | --- | --- |
| 2,403,474 | Bartleson | July 9, 1946 |
| 2,403,894 | Bartleson | July 9, 1946 |

OTHER REFERENCES

Journal of American Chem. Soc. (1948), vol. 70, pp. 744–746.